United States Patent [19]
Wilmot

[11] 4,031,364
[45] June 21, 1977

[54] MULTIPLE MOMENT VIDEO DETECTOR

[75] Inventor: Richard D. Wilmot, Buena Park, Calif.

[73] Assignee: Hughes Aircraft Company, Culver City, Calif.

[22] Filed: Nov. 10, 1975

[21] Appl. No.: 630,592

[52] U.S. Cl. .................. 235/151.3; 235/151.13; 235/156; 307/358; 343/5 DP; 358/167
[51] Int. Cl.² .................. G06F 7/38; G01S 9/02
[58] Field of Search .......... 235/151.3, 151.13, 193, 235/197, 156; 343/5 DP; 307/235 B, 235 J, 235 K; 178/DIG. 12, 22; 324/77 A, 77 B; 444/1

[56] References Cited
UNITED STATES PATENTS

| | | | |
|---|---|---|---|
| 3,493,874 | 2/1970 | Finkel et al. | 307/235 B X |
| 3,549,877 | 12/1970 | Goldman | 235/193 |
| 3,755,696 | 8/1973 | Nicolson et al. | 307/235 K X |
| 3,761,922 | 9/1973 | Evans | 343/5 DP |
| 3,797,014 | 5/1974 | Tompkins et al. | 343/5 DP |
| 3,838,422 | 9/1974 | MacArthur et al. | 343/5 DP X |

*Primary Examiner*—Joseph F. Ruggiero
*Attorney, Agent, or Firm*—W. H. MacAllister; Walter J. Adam

[57] ABSTRACT

An improved video clutter processor utilizing a multiple moment detector that provides a constant false alarm rate regardless of the probability distribution of the radar clutter. The processor provides an adaptive threshold that is a function of multiple moments to compensate for variation in parameter of a selected number of parameter probability distributors. In accordance with the invention either moments around the origin may be combined to establish the threshold or central moments may be combined for the threshold level. In one arrangement of the invention, digital delay lines store the quantized sample video and the second, third and fourth powers of the quantized video which are the mean values about the origin are estimated by dividing the sum of the quantized videos by a number equal to the number of combined values to provide the moments about the origin. The second, third and fourth moments about the mean which are the central moments are obtained by transform relations providing either the maximum likelihood method or substantially near to the maximum likelihood method. The threshold is then obtained by multiplying each of the central moments by multiplying factors $K_i$ and adding each of these factors plus a factor $K_o$ which corresponds to an offset term. Thus, the adaptive threshold T is a function of all the four moments and it is able to compensate for variations in the parameters of a single, double, triple or quadruple parameter probability distribution. The principles of the invention includes other arrangements for deriving the mean value and includes combining of any desired number of higher moments with the threshold determined from either the selected moments around the origin or the selected central moments.

18 Claims, 11 Drawing Figures

MULTIPLE MOMENT VIDEO DETECTOR

BACKGROUND OF THE INVENTION

1. Field of the Invention

This invention relates to video processors for energy reception systems and particularly to detection arrangements that provide a constant false alarm rate for substantially any probability distribution of the received clutter and noise energy.

2. Description of the Prior Art

Conventionally, mean level detectors have been utilized to implement an adaptive threshold which samples the video amplitude in contiguous range and/or azimuth bins and changes the detection threshold in response to changes in the mean or average value of the clutter. A mean level detector compensates only for changes in the average value which is the first moment of the probability density function of the clutter. Thus, the mean level detector is only effective against clutter with a single parameter probability density function such as the Rayleigh density function. The Rayleigh probability density function is given by $$f(x) = \frac{x}{\alpha^2} e^{-x^2/2\alpha^2}$$

where $x$ is the voltage and $\alpha$ is the standard deviation of the Gaussian noise before envelope detection, and the mean or expected value is given by $m = \alpha \sqrt{\pi/2}$ with the standard deviation $$\sigma = \alpha \sqrt{2 - \frac{\pi}{2}}.$$

Thus, both the mean and the standard deviation are functions only of $\alpha$, and sigma $\sigma = .52272m$ so that a Rayleigh distribution and all of its moments are completely defined by a single parameter. The mean level detector by estimation of the mean value can thus compensate for any changes in Rayleigh distribution clutter. The probability of a false alarm is $$P_{fa} = e^{-T^2/2\alpha^2} = e^{-T^2/\frac{4}{\pi} m^2}$$

so that the false alarm rate can be completely controlled by setting the threshold $t$ as a specified function of $m$. As a result, the probability of a false alarm rate remains constant with changes in the mean value because the threshold is uniquely determined by the mean. However, for distributions with more than one parameter, the mean level detector does not provide a constant false alarm rate and if the sigma is doubled, for example, the false alarm rate would increase by a large amount. A detecting system that utilizes a plurality of moments to establish the detection threshold would be a substantial advantage to the art in handling various clutter distributions. Some prior art systems have utilized first and second thresholds with the mean deviate estimate utilized to estimate the standard deviation of the reference cells such as in an article, "Modified Generalized Sign Test Processor For 2-D Radar" by G. V. Trunk et al, published in the IEEE Transactions On Aerospace And Electronic Systems, Vol. AES-10, No. 5., Sept. 1974. This prior art technique utilizes the absolute value of the deviations rather than the second moments and it has been found to require a substantially larger number of samples in order to provide the accuracy that would result from the use of the first and second moments.

SUMMARY OF THE INVENTION

The multiple moment video detector in accordance with the invention, utilizes the first four moments or selected ones of the first four moments to establish the detection threshold so that any type of distribution can be processed with a substantially constant false alarm rate. The sample mean is utilized as an estimate of the mean value in amplitude of the video signals and digital delay lines store the quantized video and the second, third and fourth powers of the quantized video. The $r^{th}$ moment about the origin is determined by summing the input signals $x_i^r$ and dividing by the frequency of occurrence $n$. Thus a running sum is kept of the sum of the quantized videos and its powers and the first $r$ moments are then estimated by dividing the sum of the quantized videos raised to the $r$ powers by $n$. In the arrangement in accordance with the invention utilizing the central moments, the second, third and fourth moments about the means are obtained by a mathematical transform relationship which at least for the second moment is a maximum likelihood estimator. The threshold is obtained by multiplying each of the central moments by a selected multiplying factor $K_i$ and adding each of these factors plus an offset term $K_0$ to provide a threshold that has adapted as a function of all four moments, for example, which can compensate for variations in the parameters of a single, double, triple or quadruple parameter probability distribution. It has been found that substantially all probability distributions can be defined by four moments but the principles of the invention are equally applicable to the use of any selected combination of the first moment and of the higher moments. In other arrangements that provide the improved detection in accordance with the principles of the invention unbiased estimates may be provided or different arrangements may be utilized to obtain the central moments by subtracting the sample mean from the data before it is raised to its corresponding power.

It is therefore an object of this invention to provide an improved video threshold detector having a substantially constant false alarm rate regardless of the probability distribution of the clutter and/or noise in the video signal.

It is another object of this invention to provide a detection system that utilizes the higher moments for reliable threshold detection.

It is a further object of this invention to provide a clutter detection system that is adaptable to different probability density distributions of the clutter or other received or generated noise.

It is a still further object of this invention to provide a simplified and reliable signal detection system that developes an accurate threshold for substantially any probability density distribution of the signal energy so as to maintain a substantially constant false alarm rate.

BRIEF DESCRIPTION OF THE DRAWING

The novel features of this invention as well as the invention itself both as to its method of orginization and method of operation, will best be understood from the accompanying description, taken in connection with the accompanying drawings, in which like reference characters refer to like parts and in which.

DESCRIPTION OF THE PREFERRED EMBODIMENT

Figure 1:
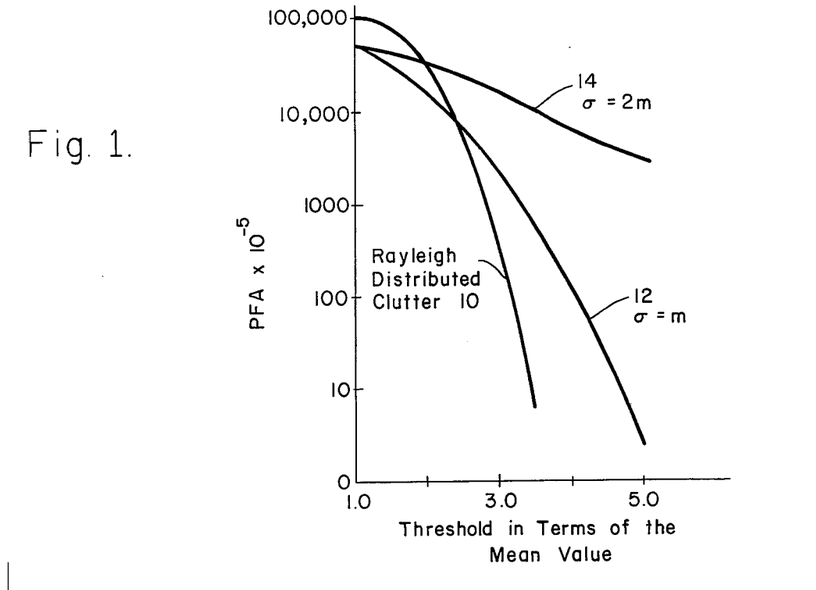
FIG. 1 is a graph of the probability of false alarm (PFA) versus threshold in terms of the mean value showing the PFA for Gaussian clutter for two values of the deviation, sigma and showing the PFA for Rayleigh distributed clutter.

Referring first to FIG. 1 a curve 10 shows the probability of false alarm (PFA) as a function of the threshold T for a sigma equal to $m$. Thus as shown by a previous expression for PFA, for a Rayleigh distribution which is completely describable by a single parameter, the false alarm rate can be completely controlled by setting the threshold T as a specified function of the mean value $m$. For example, if the threshold $T = 2m$ then $P_{FA} = e^{-4m^2 \pi /4m^2} = 0.0432$ and this PFA should remain constant with changes in the mean value $m$ because the threshold is uniquely determined by the mean. Thus the mean level detector provides a constant false alarm rate for Rayleigh or other single parameter distributions. The Gaussian distribution for a standard deviation or sigma of $m$ and a sigma of $2m$ is shown by respective curves 12 and 14 which illustrate that a mean level detector can compensate for changes in the mean, but if the sigma is doubled the false alarm rate would increase by a large amount. For example with a threshold equal to 5 times the mean, the PFA equals $3 \times 10^{-5}$ and if the sigma is doubled the PFA increases to $3 \times 10^{-1}$ so that doubling sigma causes a 10,000 fold increase in the probability of false alarm.

Figure 2:
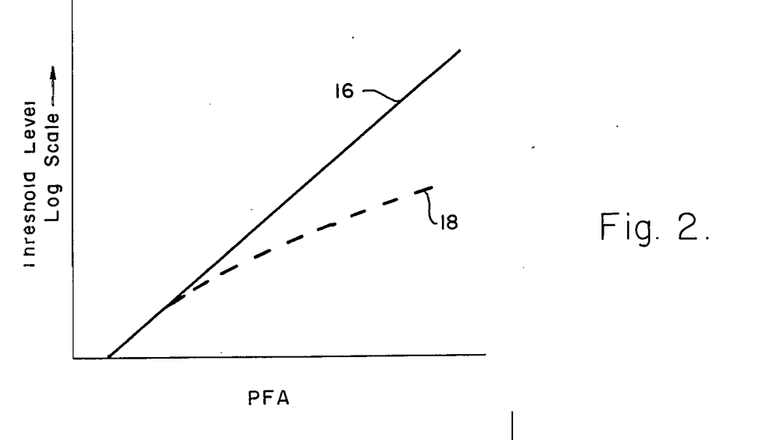
FIG. 2 is a graph of the threshold level on a log scale of probability of being equal to or greater than the threshold or probability of false alarm versus threshold level showing experimental clutter data and Rayleigh distribution data plotted on log normal paper.

Referring now to FIG. 2 a curve 16 derived from experimental data for actual radar ground clutter is linear on log normal paper indicating that it has a log normal distribution which has four (3 independent, 1 dependent) parameters. A curve 18 shows a Rayleigh distribution function on the same graph illustrating that the mean level or first moment detector would be inadequate for this ground clutter distribution or for any other type of multiple parameter satistical distribution.

Figure 3:
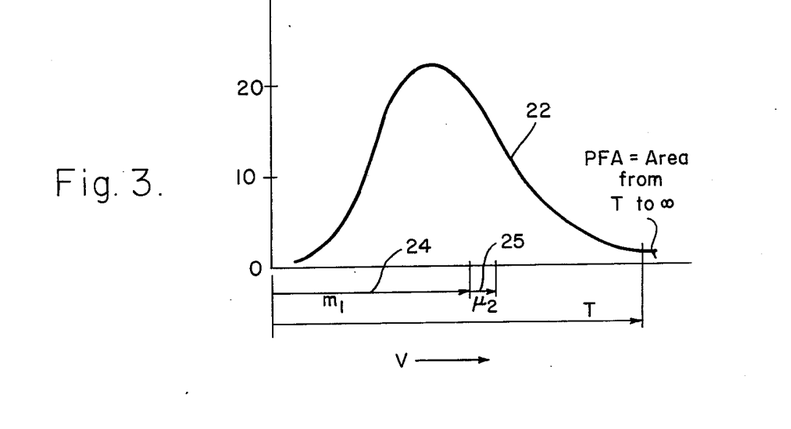
FIG. 3 is a diagram showing a curve of a Johnson $S_u$ distribution of probability of occurrence as a function of voltage for further explaining the moments utilized in the system of the invention.

Referring now to FIG. 3 a curve 22 illustrates a Johnson $S^u$ clutter distributions for one false alarm rate with a voltage threshold T for that distribution. This Johnson $S^u$ distribution is defined by four independent parameters. The calculated moments for this clutter distribution are $m_1 = 0.0345$ $\mu_2 = 0.00009604$, $\mu_3 = 0.0000008188$ and $\mu_4 = 0.00000004538$ where $m_1$ is the sample mean or first moment, $\mu_2$ is the second moment or second moment about the mean, $\mu_3$ is the third central moment or third moment about the mean and $\mu_4$ is the fourth central moment or fourth moment about the mean. To further explain the statistical concepts utilized in the system of the invention, the moments about the origin, $m_1$, $m_2$, $m_3$ and $m_4$ are referenced to the origin rather than the center of the curve 22 and the central moments are referenced to the mean value or center of distribution of the curve 22. The first moment or mean defines the center of distribution of the curve 22, the second moment, either about the origin or the mean provides an indication of the spread or deviation of the curve 22, the third moment either about the origin or the mean provides an indication of skewness or assymetrical distribution and the fourth moment either about the origin or the mean provides an indication of the kurtosis or degree of flatness of the distribution. The required values of the constants for the Johnson $S_u$ distribution are selected as $K_1 = 1.74$, $K_2 = 1.0$, $K_3 = 1.0$ and $K_4 = 1.0$. The threshold for this distribution is $T = K_1 m_1 + K_2 \mu_2 + K_3 \mu_3 + K_4 \mu_4 = 0.06$. The moments $m_1$ about the origin is shown by an arrow 24 and the central moment $\mu_2$ is shown by an arrow 25. The central moment $\mu_3$ is between $m_1$ and $\mu_2$ is approximately $m_1 + 0.1$ $(\mu_2 - m)$ and the central moment $\mu_4$ is between $m_1$ and $\mu_3$ and is approximately $m_1 + 0.05$ $(\mu_3 - m_1)$. The probability of a false alarm rate PFA which is the area under the curve 22 from T to $\infty$ may be expressed as $$PFA = \int^{\infty} f(x) \, dx = 0.17.$$

It can be seen that as the distribution changes, the position of T changes and the PFA varies unless an adaptive detection is provided in accordance with the invention. The Johnson $S_u$ distribution which has four moments is well known in the art such as described in the book "Statistical Models in Engineering" by Gerald J. Hahn and Samuel S. Shapiro, John Wiley and Sons.

Figure 4:
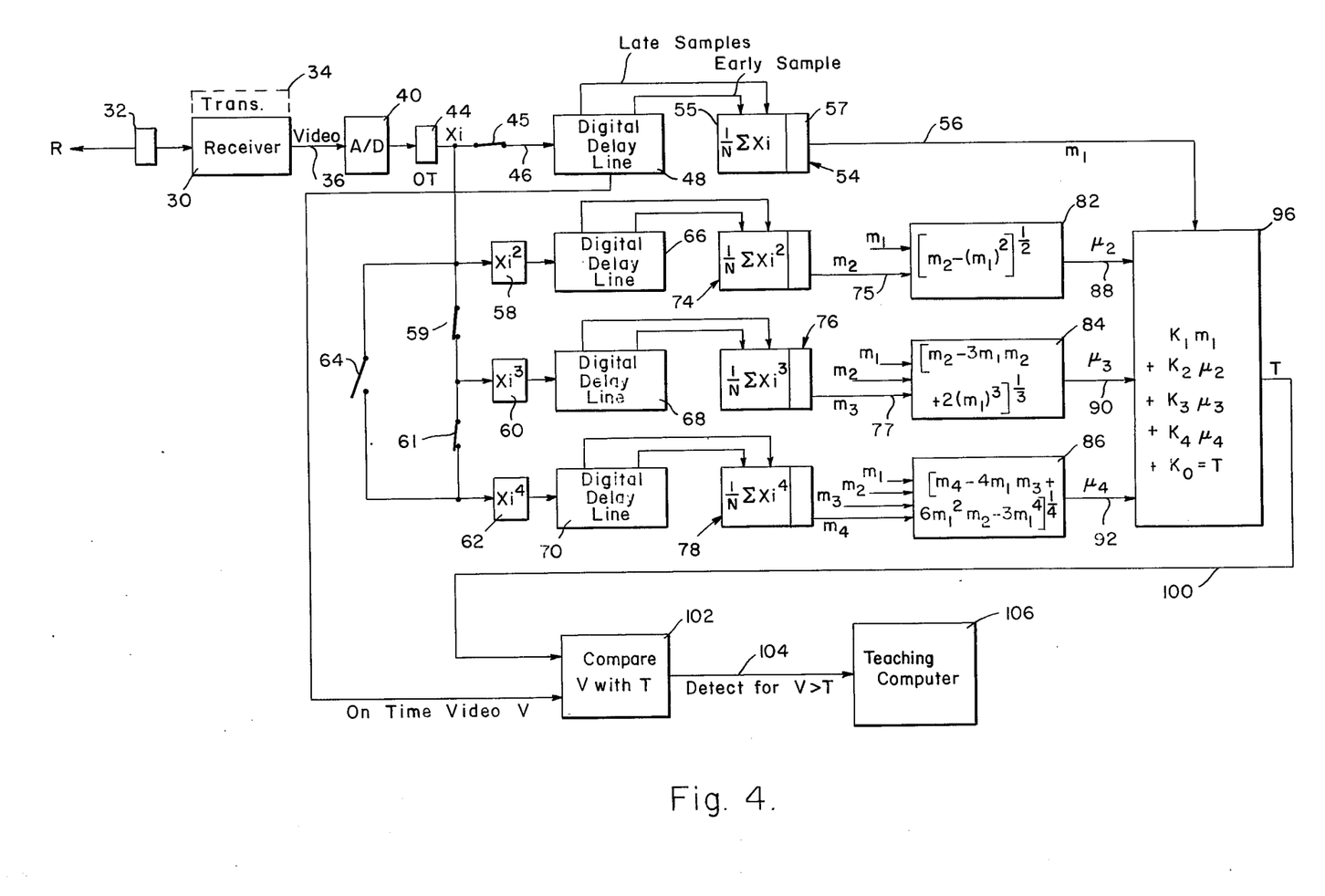
FIG. 4 is a schematic block diagram of one arrangement of the multiple moment video detector in accordance with the principles of the invention which determines the moments about the origin and then transforms them to the central moments which are combined to form the threshold value.
Figure 8:
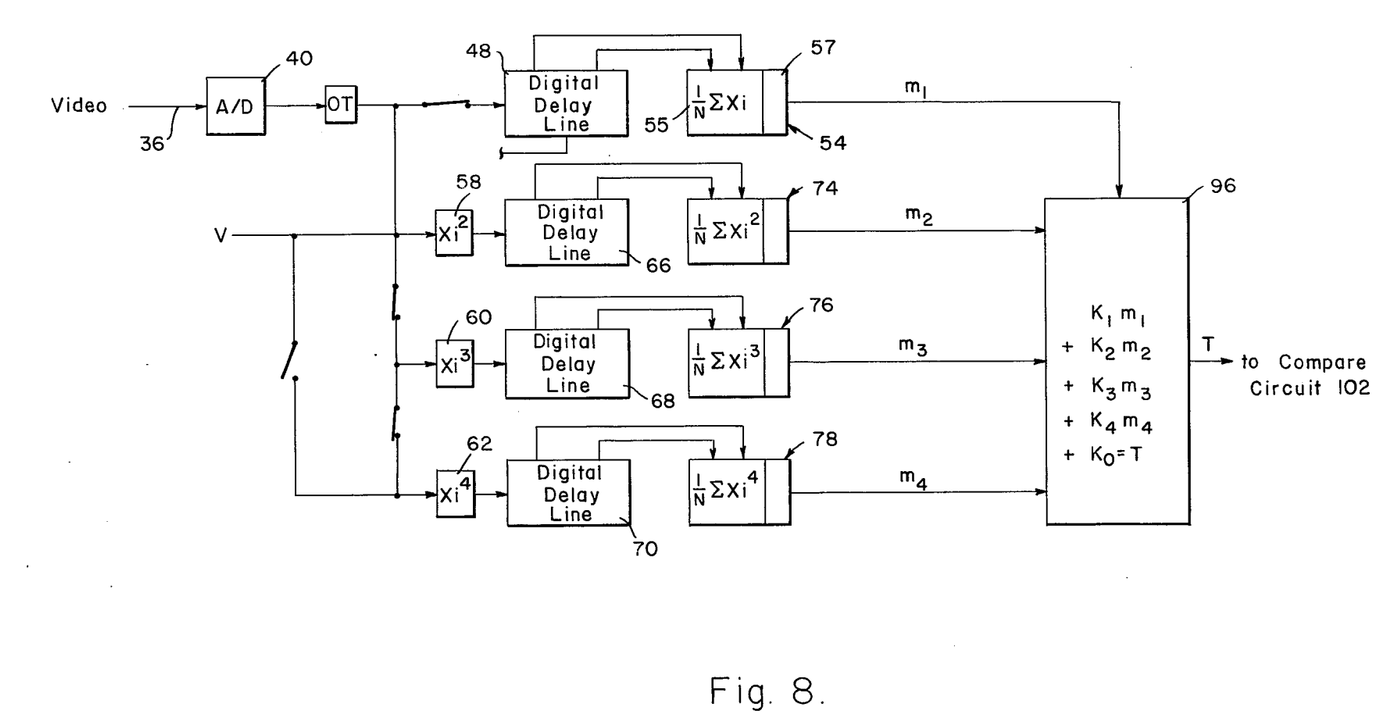
FIG. 8 is a schematic block diagram of another arrangement of the multiple moment video detector in accordance with the invention combining the moments about the origin to determine the threshold level.

Referring now to FIG. 4 a system in accordance with the invention may operate in response to energy signals of any type having clutter or noise distributions that must be distinguished from the desired signal in transmission and reception systems or reception systems such as radar, infrared, sonar or laser systems. A receiver 30 responds to energy from a sensor 32 derived over a range dimension R at selected or discrete azimuth positions for example. The receiver 30 and sensor 32 may be compatible to either passive type systems without a transmitter or active type systems in which a transmitter 34 shown dotted may be utilized. The signal developed in the receiver 30 is applied through a lead 36 as a video signal to an A/D converter 40 where it is converted to a digital form of a predetermined number of bits and applied to an OT (On Time) storage unit or register 44. The digital video signal $X_i$ is then applied on a composite lead 46 through a switch 45 to a digital delay line 48 forming part of the mean level detector supplying early samples and late samples to a unit 54 which sums a selected number of video signals and divides by the number n of signals summed, to form the first moment signal $m_1$ on a lead 56 which signal is the mean value derived from the sample mean. As is well known in the art the delay lines such as 48 may be 16 words in length for 16 samples and the first 8 words or early samples are combined in the summer 54 with the last 8 words or late samples to provide a sample of 16 words or signals($n = 16$). The unit 54 for example may be a summation and accumulation unit 55 followed by a right shift of the summed digital value indicated as a unit 57 for dividing by $n = 16$. The video signal on the lead 46 is also applied to a squaring circuit 58, through a switch 59 to a cubing circuit 60 and through a switch 61 to a quadrupling circuit 62. The circuits 58, 60 and 62 may for example be read only memories addressed by the value of $X_i$ to read out the proper output or may be any other suitable type of circuit arrangement. Because the principles of the invention are applicable to using the first and second moments, the first, second and third moments, or the first, second and fourth moments, or any other desired combination of n moments, a switch 64 shown in its open position which with switches 45, 59 and 61 illustrate that for various conditions of clutter distribution any desired combination of moments may be utilized. The units 58, 60 and 62 have their composite output leads coupled to respective digital delay lines 66, 68 and 70 which in turn are respectively coupled to summing and dividing units 74, 76 and 78. The delay lines 48, 66, 68 and 70 as well as the summing and dividing units 54, 76 and 78 may respectively be similar arrangements as are well known in the art as discussed relative to unit 54. The digital delay lines may have a number of storage flip flops or units at each stage equal to the number of bits for each signal arranged to shift the video words from stage to stage. The summing and dividing units 74, 76 and 78 develop the respective higher moments $m_2$, $m_3$ and $m_4$ all of which are the moments about the origin. In the arrangement of FIG. 8 the moments about the origin are combined in a summing unit, adder or summer 96 to provide the adaptable threshold in accordance with the principles of the invention. In the arrangement of FIG. 4 the higher moments about the origin are transformed to moments about the mean before combining them to provide the adaptive threshold of the invention. Both arrangements are shown to illustrate different mechnizations to provide the improved constant false alarm rate in accordance with the principles of the invention.

In the arrangement of FIG. 4 the second, third and fourth moments about the mean called the central moments are obtained by respective transform units 82, 84 and 86. These central moments $\mu_2$, $\mu_3$ and $\mu_4$ are thus generated in the respective transform units 82, 84 and 86 and applied to output leads or composite leads 88, 90 and 92. The second moment or the variance is developed in unit 82 and is equal to the second moment minus the square of the first moment with the square root being taken to obtain the estimate of the standard deviation, $[m_2 - (m_1)^2]^{1/2}$. The third central moment developed in unit 84 is equal to the third moment minus 3 times the product of the first and second moments plus 2 times the first moment cubed with the cube root being taken of the entire quantity, expressed as $[m_3 - 3m_1m_2 + 2(m_1)^3]^{1/3}$. The cube root is taken to obtain a standardization value with the same units as the mean and standard deviation. The fourth central moment is obtained in a similar way in unit 86 and is equal to the fourth moment minus 4 times the product of the first and second moments plus 6 times the product of the first moment squared times the second moment minus 3 times the fourth power of the first moment, which may be expressed as $[m_4 - 4m_1m_3 + 6(m_1)^2m_2 - 3(m_1)^4]^{1/4}$. These transform relations between the moments about the origin and the central moments about the mean are well known in the art and are described in the book "Modern Probability Theory And Its Applications, by Emanuel Parzen, John Wiley and Sons Inc. For developing the moments about the origin, a moment r about $x = 0$ or the origin of input data $X_i, \ldots, X_k$ having a sample mean $\overline{X}$, and the moment $$m_r = \left(\frac{1}{n}\right) \sum_{i=1}^{n} x_i^r$$

and n = the number of samples and r is equal to 1, 2, 3 or 4. The units 58, 60 and 62 provide the values $X_i^r$, the digital delay lines 48, 66, 68 and 70 along with the summing and accumulation portions of units 54, 74, 76 and 78 provide the summation and the portions of the units 54, 74, 76 and 78 such as dividing circuit 57 of unit 54 provides the division by n. The concept of moments about the origin is well known in the art such as explained in the book "Handbook of Probability And Statistics With Tables", by Burrington and May, Handbook Publishers, Inc.

The threshold T is generated in the summer 96 by multiplying each of the central moments by a different multiplying factor $K_1$, $K_2$, $K_3$ and $K_4$ and adding each of these factors plus a factor $K_0$ which corresponds to an offset term, to apply the signal T to a composite output lead 100. It is to be understood that when less than four moments are utilized, the summer 96 is modified accordingly. By making the appropriate $K_i$ multiplier zero, any combination of the sum of moments can be obtained. The threshold signal is applied through the lead 100 to a compare circuit 102 that compares T with the on time video r from the on time video storage register 44 and provides a detection signal on an output lead 106 when r is greater than T. The lead 104 may apply the detected signals to a suitable utilization circuit 106 which for example may be a tracking computer.

Figure 5:
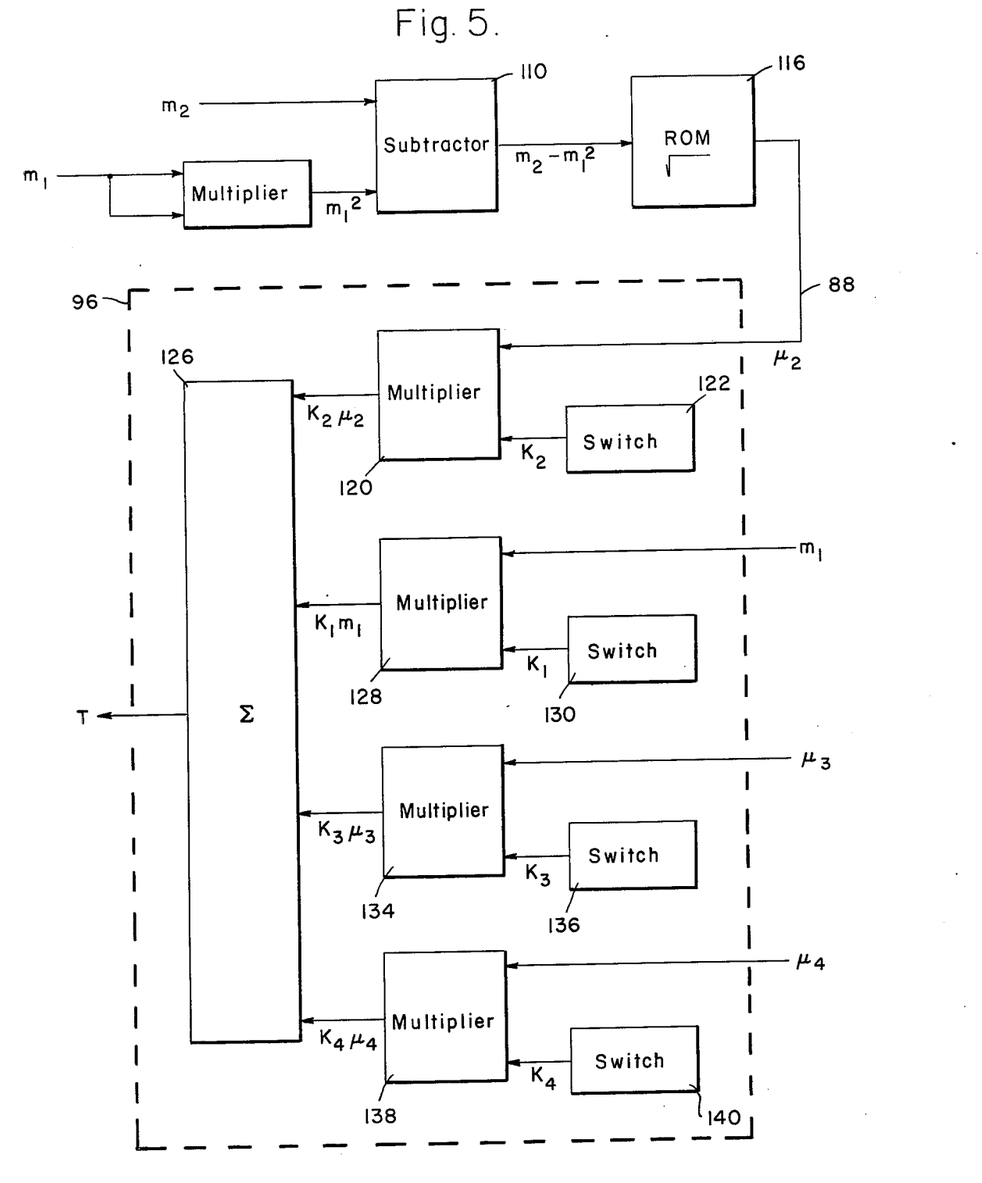
FIG. 5 is a schematic block diagram further detailing the generation of the second central moment and the threshold value T in the system of FIG. 4.

In order to further explain the transform unit 82 and the summing unit 96, reference is now made to FIG. 5 which shows a subtractor 110 receiving the central moment $m_2$ as well as $m_1^2$ derived from a multiplier 112 receiving the central moment $m_1$ at its two input terminals. The subtractor 110 applies the signal $m_2 - m_1^2$ to a read only memory (ROM) 116 which is illustrated as a square root circuit to generate the central moment $\mu_2$ on the lead 88. The signal on the lead 88 is applied to a multiplier 120 of the summing unit 96 which multiplier also receives parameter $K_2$ from a selectable switching source 122 to apply the product $K_2 \mu_2$ to an adder 126. A multiplier 128 responds to the first moment around the origin $m_1$ and a value of $K_1$ from a switching source 130 to apply the term $K_1$, $m_1$ to the adder 126. A multiplier 134 receives a central moment $\mu_3$ and a multiplying constant $K_3$ from a switching source 136 to apply the term $K_3$, $\mu_3$ to the adder 126. A multiplier 138 receives a central moment $\mu_4$ and a multiplying constant $K_4$ from a switching circuit 140 to apply the term $K_4 \mu_4$ to the adder 126.

Figure 6:
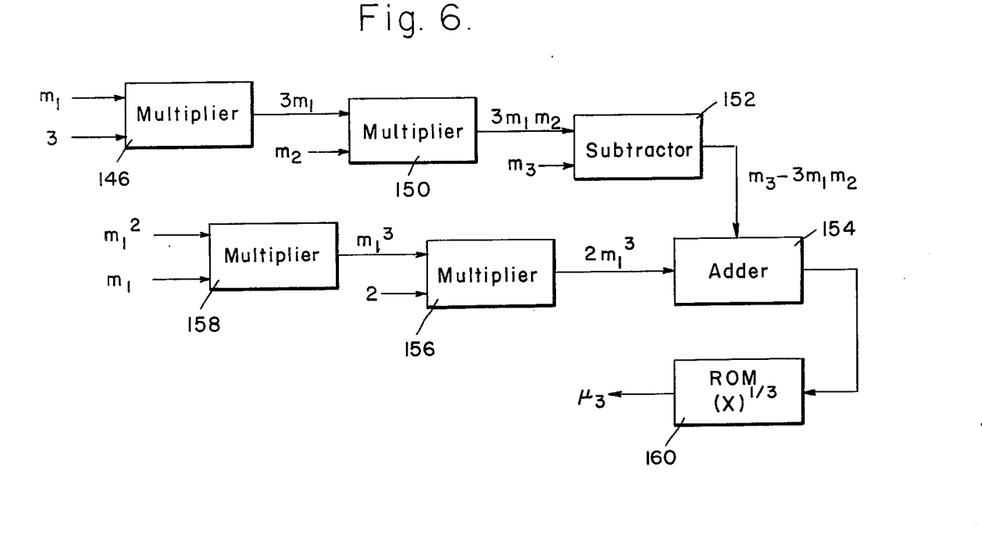
FIG. 6 is a schematic block diagram further detailing the generation of the third central moment in the system of FIG. 4.

Referring now to FIG. 6 which shows generation of the central moment $\mu_3$ a multiplier receives the moment $m_1$ a constant 3 to apply the term $3m_1$ to a multiplier 150 which also receives $m_2$ to apply the term $3 m_1$, $m_2$ to a subtractor 152. The term $m_3 - 3m_1$, $m_2$ is applied from the subtractor 152 to an adder 154 also receiving a term $2m_1$ cubed from a multiplier 156. The moments $m_1$ squared and $m_1$ are applied to a multiplier 158 to generate the term $m_1$ cubed which in combination with the multiplying factor 2 is applied to the multiplier 156. A summed derived from the adder 154 is applied to a read only memory 160 which by a conventional memory look up procedure indicated as $(x)^{1/3}$ developes a cube root term which provides the central moment $\mu_3$.

Figure 7:
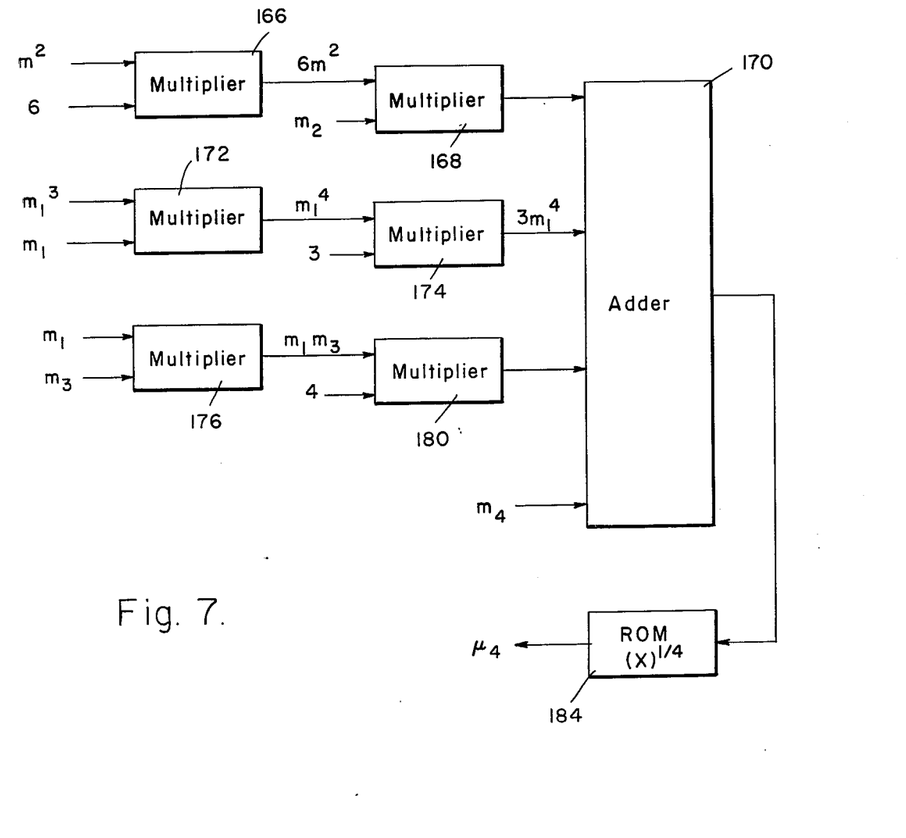
FIG. 7 is a schematic block diagram further detailing the generation of the fourth central moment in the system of FIG. 4.

Referring now to FIG. 7 the generation of the central moment $\mu_4$ may include a multiplier 166 receiving the terms $m_1$ squared and a constant 6 to apply a term $6m_1$ squared to a multiplier 168 which also receives the central moment $m_2$ to generate the term $6m_1$ squared $m_2$ which is applied to an adder 170. A multiplier 172 receives the terms $m_1$ cubed and $m_1$ to apply the term $m_1$ to the fourth power to a multiplier 174 also receiving a constant 3 to generate the term $3m_1$ to the fourth power which is applied to adder 170. A multiplier 176 receives the terms $m_1$ and $m_3$ to apply a term $m_1$ $m_3$ to a multiplier 180 also receiving a constant 4 to apply a term 4 $m_1$ $m_3$ to adder 170. The term $m_4$ is also applied to the adder 170 to generate the transform term which is applied to a read only memory 184 which looks up the fourth power to provide the central moment $\mu_4$.

Referring now to FIG. 8, as previously discussed the principles of the invention also include combining the moments about the origin in the adder 96 to develop the threshold term T. This arrangement of FIG. 8 provide a threshold change when any of the selected number of moments change to compensate for noise and clutter that may effect any of the moments and is another arrangement for mechanization to provide the improved threshold detecting system in accordance with the invention.

Figure 9:
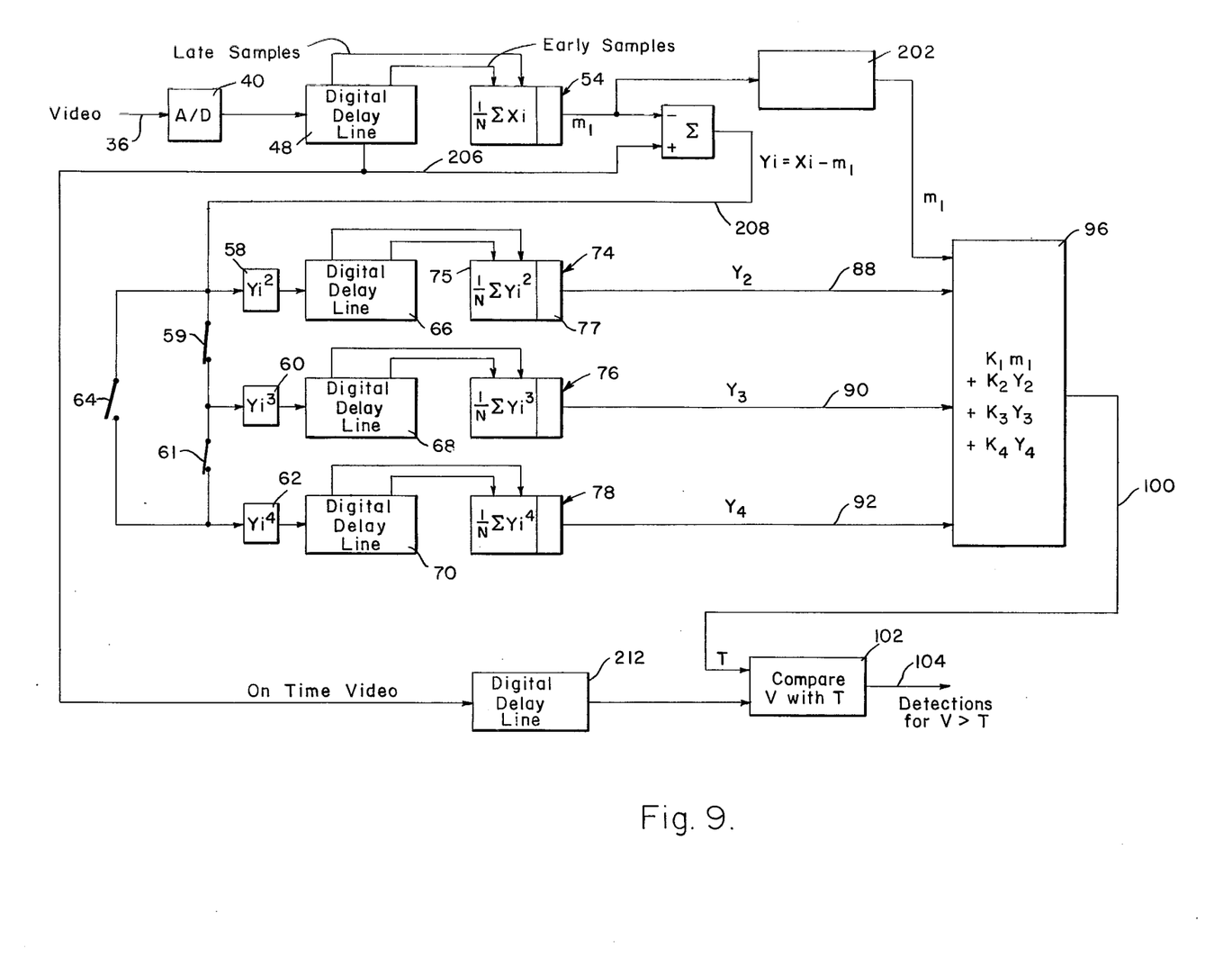
FIG. 9 is a schematic block diagram of another arrangement of the multiple moment detector in accordance with the invention in which the sample mean is subtracted from the data before to form the higher central moments without a transformation to develop a normalized threshold value, which value fluctuates over a relatively small dynamic range

Referring now to FIG. 9 which is another implementation in accordance with the principles of the invention that is mathematically equivalent relative to controlling the threshold, to the implementation of the other arrangements in accordance with the invention. This arrangement has the advantages that the threshold value is normalized (the mean is subtracted out) so that the detected signal is normalized which may be desirable for some display or processing purposes. Also the threshold has a relatively small dynamic range which simplifies the system mechanization. This implementation subtracts the sample means from the data before computing the central moments. This arrangement to develop the moments about the mean $\overline{X}$ may be expressed as $$\mu_r = (1/n) \sum_{i=1}^{n} (X_i - \overline{X})^r$$

where $X_i$ is the on time signal data, as shown in "The Handbook Of Probability And Statistics". The switches 59, 61 and 64 are included to illustrate that for some applications different combinations of the higher moments may be desired to be utilized with the first moment. The sample mean $m_1$ from the summing unit 54 is applied to a summer 200 as well as to a digital delay line 202 in order to align the mean $m_1$ with the higher moments. The summer 200 also receives the on time video $X_i$ from the center of the 16 bit long delay 48 on a lead 206 to develop a value $Y_i = X_i - m_1$ on a lead 208 in which the sample mean is subtracted from the data. The signal $Y_i$ is then applied to the lead 208 to the respective squaring, cubing and multiplication by units 58, 60 and 62 and after being applied to the digital delau line 66, 68 and 70, is applied to the summing units 74, 76 and 78 which provide summing, accumulation and division. Each unit such as 74 includes a summing and accumulation unit 75 and a division unit 77 which for example, may be connections to provide a right shift when $n = 16$. The higher central moments $Y_2$, $Y_3$, and $Y_4$ are applied from the respective units 74, 76 and 78 to the summer or threshold genrating unit 98 also receiving the first moment $m_1$ from the digital delay line 202, and the threshold T is applied to a lead 100. The on time video is applied to a digital delay line 212 to align the video with the threshold signal. The on time video is thus applied to the compare circuit 102 in time for coincidence with the threshold signal T to provide a detection indicating signal on the lead 103. The arrangement of FIG. 9 does not require the mechanization of the arithmetic transform functions but does require delay elements not required in the other arrangements in accordance with the invention.

Figure 10:
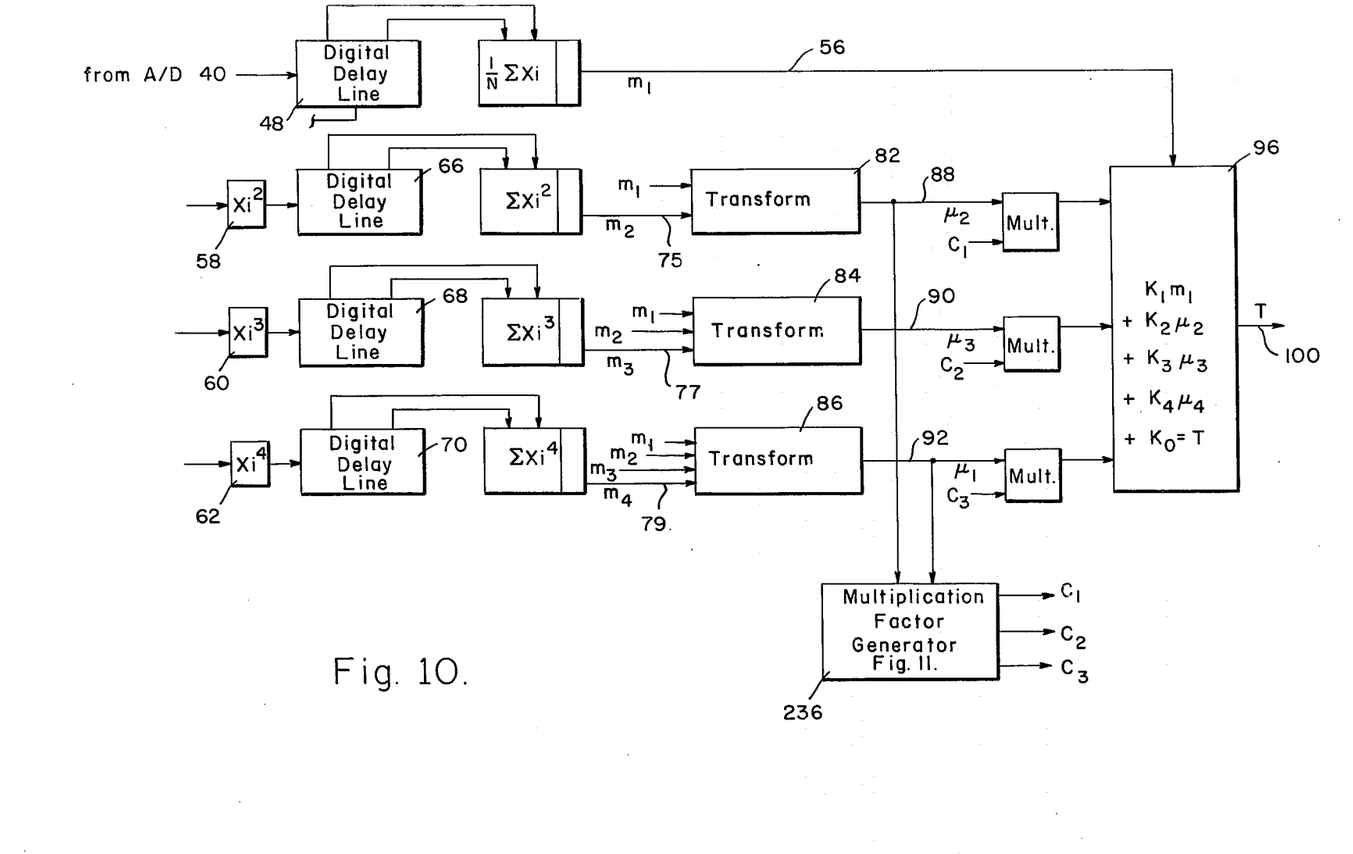
FIG. 10 is a schematic block diagram of another arrangement in accordance with the principles of the invention in which the higher moments are multiplied by factors to provide unbiased estimates or true value of the estimates.

Another arrangement that provides a highly adaptive threshold in accordance with the invention is shown in FIG. 10 in which the second, third and fourth central moments are multiplied by values to obtain unbiased estimates. As is well known in the art, the estimated moments may be skewed off from the true mean to the right or left which condition provides suitable detection operation by responding to the variations of the higher moment estimates. The unbiased or true value of the threshold may be desired for some display or processing functions rather than biased values. The moments generated on the leads 88, 90 and 92 are applied to multipliers 230, 232 and 234 also receiving multiplying factors $c_1$, $c_2$, and $c_3$ which in turn apply unbiased higher moments to the summing unit 96. A multiplication factor generator 236 provides the factors $c_1$, $c_2$ and $c_3$. The arrangement of FIG. 10 similar to the other arrangements in accordance with the invention, allows the threshold to change when any of the moments either jointly or singly compensate for any change in the noise or clutter distribution.

Figure 11:
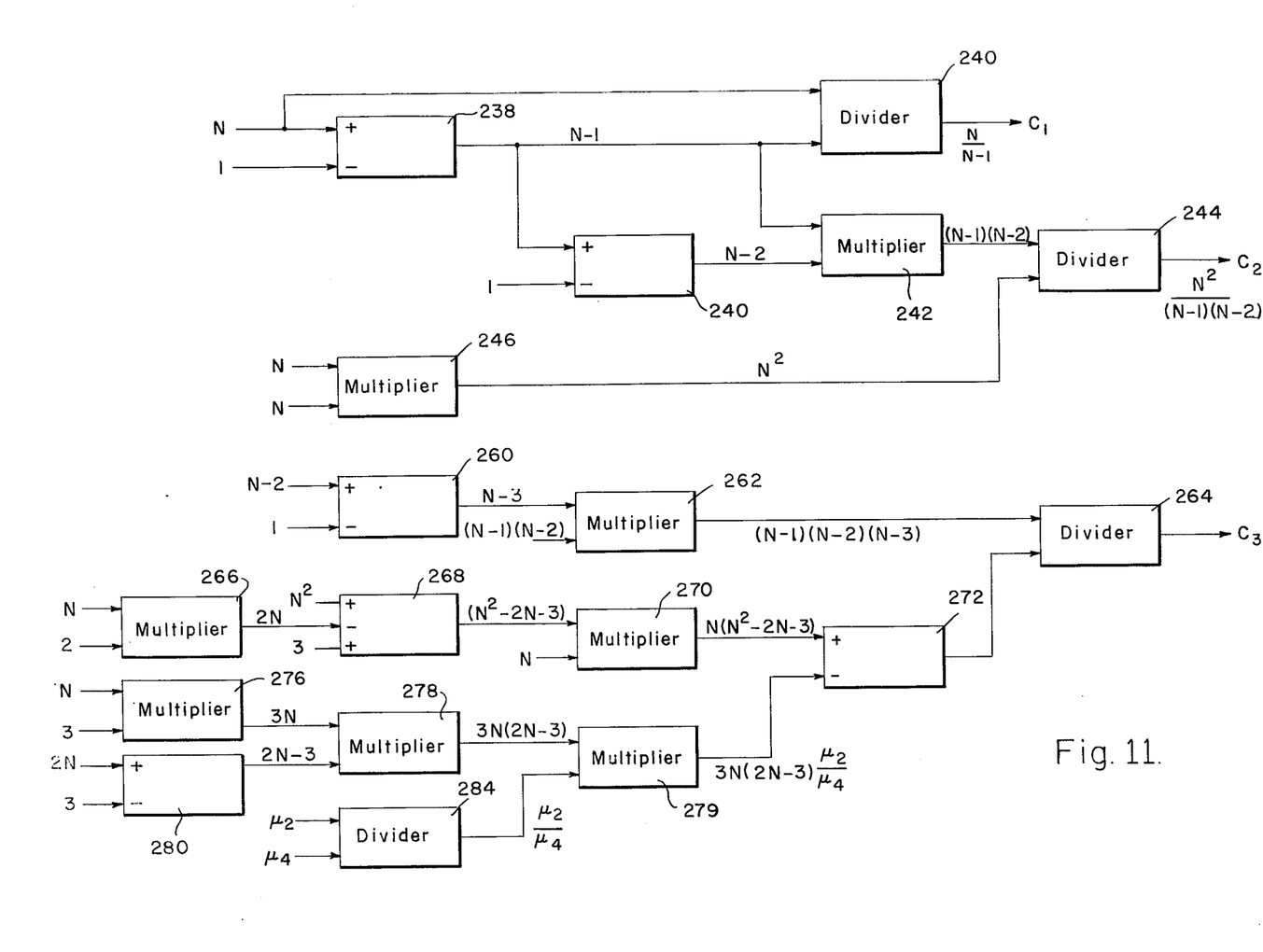
FIG. 11 is a schematic block diagram showing the generation of the multiplication factors to provide the unbiased estimates in the system of FIG. 10.

Referring now also to FIG. 11 the multiplication factor generator 236 for generating the constant $c_1$, $c_2$ and $c_3$ and receiving the central moments $\mu_2$ and $\mu_4$ from respective leads 88 and 92 will be explained in further detail. A subtractor unit 238 responds to a constant n which for example may be 16, and a constant 1 to provide the term $n - 1$ which is applied to a divider 240 along with the constant n to develop the term $n/n-1$ which is the unbaised estimator multiplier value $c_1$. A subtractor 240 receives the term $n-1$ and the constant 1 to apply a term $n - 2$ to a multiplier 242 which in turn applies a term $(n - 1)(n - 2)$ to a divider 244 also receiving a term $n^2$ from a multiplier 246. The divider 244 generates the term $n/(n - 1((n - 2))$ which is the unbiased multiplier constant $c_2$. A subtractor 260 responds to the term $n - 2$ and a constant 1 to develop the term $(n - 3)$ which is applied to a multiplier 262 also receiving the term $(n - 1)(n - 2)$ to develop a term $(n - 1)(n - 2)(n - 3)$ which is applied to a divider 264. A multiplier 266 responds to the terms $n$ and 2 to apply a term $2n$ to a multiplier 268 also receiving the terms $n^2$ and 3 to generate a term $n(n^2n - 3)$ which is applied to a multiplier 272. A multiplier 276 receives a term $n$ and a constant 3 to apply the term $3n$ to a multiplier 278 also receiving a term $(2n - 3)$ from a subtractor 280 responsive to the terms $2n$ and 3. The multiplier 278 applies a term $3n(2n - 3)$ to a multiplier 280 also receiving the terms $\mu_2/\mu_4$ from a dividier 284 responsive to the central moments $\mu_2$ and $\mu_4$. The multiplier 280 applies a term $3n(2- 3) \mu_2/\mu_4$ to the subtractor 272 which applies the dividend to the divider 264 which in turn generates the unbiased multiplier term $c_3$. Unbiased estimators or moments are well known in the art and is described in the book "Handbook of Probabilities And Statistics With Tables". It is to be noted that the arrangement of FIG. 10 receives its input terms from an arrangement such as in FIG. 4 so that any combination of the 4 moments may be utilized depending on the requirements of the clutter or noise distribution. The arrangement of FIG. 10 provides an accurate threshold and a constant false alarm rate as any of the moments change in response to the input distribution changes.

Thus, there has been described a multiple moment video detector in which a plurality of estimator arrangements provide a threshold change responsive to change of any of the moments with compensation for noise and clutter distribution that effects any or a plurality of the moments. The principles of the invention are applicapable to a detector arrangement utilizing any selected number of moments from 2 to 4 depending on the characteristics of the distribution of the noise or clutter that is received in the system. In the arrangements in accordance with this invention, the moments are generated and responsive to the input energy distribution so that the threshold is adapted to provide a substantially constant false alarm rate. The mechanization in accordance with the invention is not to be limited to the illustrated arrangements but other digital mechanizations such as a central processor may be utilized, or partially or totally analog arrangements may be utilized, all within the scope of the invention. The scope of the invention includes a plurality of estimator mechanizations all of which provide a response that maintains the constant false alarm ratee. Although the systems in accordance with the invention have been illustrated with hardware mechanization, it is to be understood that software in a processor or formware mechnizations are included within the scope of this invention.

What is claimed is:

1. A detector system responsive to a source of signals of a statistically varying frequency of occurrence distribution comprising:
   first means responsive to said source of signals for generating in parallel a plurality of r moments of said varying distribution; and
   second means coupled to said first means for multiplying each moment by a selected constant and combining said moments to develop a threshold signal.

2. The combination of claim 1 in which said first means includes means to generate the first r moments.

3. The combination of claim 1 in which said first means includes means to generate said moments as moments about the origin.

4. The combination of claim 3 in which said first means includes means coupled between said first means and said second means to generate said moments as central moments.

5. The combination of claim 1 in which said first means includes a plurality of channels for each of the moments,
   each channel including means for providing signals each equal to the corresponding power r of the input signal, and means for providing signals equal to the r moments by developing a mean value of the r power signals.

6. The combination of claim 5 in which said means for providing the r moments includes arithmetic means for each channel in turn including delay means and means for summing a selected number n of r power signals and dividing the sum by n to provide the r moment.

7. The combination of claim 6 further including transform means coupled between said arithmetic means and said second means for each channel in which r is greater than one to provide the central moments to said second means.

8. The combination of claim 5 having four channels to provide the first four moments to said second means.

9. The combination of claim 1 in which said first means generates the first four moments of said varying distribution.

10. A detector system responsive to a source of input signals having a varying frequency of occurrence distribution of amplitude and including a signal to be detected comprising:
    r first means responsive to said input signals for providing a plurality of moments of the first r moments in parallel; and
    second means coupled to said r first means for combining said moments to provide a threshold signal for use in identifying said signal to be detected.

11. The combination of claim 9 further including transform means coupled between each of said r first means of r moment greater than 1 and said second means for providing the central moments to said second means.

12. The combination of claim 9 in which said source of signals is a video source providing a video signal and each of said first means includes:

third means for providing the r power of said video signal in all channels except for the channel providing the first moment, a digital delay line coupled between said third means and said second means for storing an $n$ signal from said first means, and fourth means coupled to said digital delay line for summing said $n$ signals and dividing the sum by n to provide said $r$ moments about the origin.

13. The combination of claim 11 further including transform means coupled between said fourth means in each channel that provides an $r$ moment greater than one, and said second means for applying said second moments to said second means.

14. The combination of claim 11 in which $r$ is equal to four and having four channels.

15. The combination of claim 11 further including for each of said first means, multiplier means coupled between said fourth means and said second means, and generator means coupled to said multiplier means for providing unbiased multiplier constants for each $r$ moment greater than one.

16. The combination of claim 9 further including comparison means responsive to said threshold signal and to said input signals to provide an output signal when a signal to be detected has a greater amplitude than said threshold signal.

17. A detector system responsive to a source of input signals having a varying freqeuncy of occurrence distribution of amplitude comprising:
   first means responsive to said input signals for providing first signals which are the sample mean subtracted from each input signal,
   a plurality of parallel channels responsive to said first signals to provide $(r-1)$ central moments; and
   summing means coupled to said first means and to said plurality of channels for combining the first singals and the $(r-1)$ central moments to provide a threshold signal.

18. The combination of claim 17 in which each of said plurality of channels corresponds to an $(r-1)$ moment and includes first means for raising said first signal to the corresponding $(r-1)$ power,
   second means coupled to sid first means for delaying the signal raised to the power; and
   third means coupled to said second means for summing said delayed signals and dividing the sum by a selected sample number to develop said central moments.

* * * * *